United States Patent [19]

Mazin et al.

[11] Patent Number: 4,675,838
[45] Date of Patent: Jun. 23, 1987

[54] CONDITIONAL-CARRY ADDER FOR MULTIBIT DIGITAL COMPUTER

[75] Inventors: Moshe Mazin, Andover; Edward T. Lewis, Sudbury, both of Mass.

[73] Assignee: Delaware, Lexington, Mass.

[21] Appl. No.: 667,199

[22] Filed: Nov. 1, 1984

[51] Int. Cl.[4] .............................................. G05F 7/50
[52] U.S. Cl. .................................................. 364/788
[58] Field of Search ................. 364/768, 784, 786-788

[56] References Cited

U.S. PATENT DOCUMENTS

| | | | |
|---|---|---|---|
| 3,100,835 | 8/1963 | Bedrij | 364/788 |
| 3,437,801 | 4/1969 | Wilhem, Jr. | 364/787 |
| 4,525,797 | 6/1985 | Holden | 364/788 |
| 4,573,137 | 2/1986 | Ohhashi | 364/788 |
| 4,623,982 | 11/1986 | Ware | 364/788 |
| 4,639,888 | 1/1987 | Nussbaecher | 364/788 |

FOREIGN PATENT DOCUMENTS 964375  3/1975  Canada ................................ 364/788

OTHER PUBLICATIONS

Bedrij, "Carry Select Adder", *IRE Transactions on Electronic Computers*, pp. 340-346, Jun. 1962.

*Primary Examiner*—Archie E. Williams, Jr.
*Assistant Examiner*—Dale M. Shaw
*Attorney, Agent, or Firm*—Philip J. McFarland

[57] ABSTRACT

A multibit digital adder is shown wherein a pair of carry generating circuitries is disposed between single adders for each bit in the digital numbers to be added, each one of such carry generating circuitries being responsive to a different carry-in signal and to the level of the bits applied to the associated single bit adder to produce the proper carry-in signal to the following single bit adder.

5 Claims, 3 Drawing Figures

CONDITIONAL-CARRY ADDER FOR MULTIBIT DIGITAL COMPUTER

BACKGROUND OF THE INVENTION

This invention pertains generally to digital LSI circuitry, and in particular to a very high speed 32 bit digital adder.

Because the binary adder is a basic building block of a digital computer, the speed of any digital computer is limited by the speed at which the binary adders in such a computer may be operated. The speed at which a 32 bit adder may be operated is of particular importance in a 32 bit computer. It is known that the carry-out, $C_{OUT}$, of a first adder may be used as the carry-in, $C_{IN}$, input of a complementary second adder to increase the speed of propagation the delay associated with an inverter stage. However, in a 32 bit adder wherein an array of 16 double adders is used, speed of operation is primarily limited by the delay involved in generating a $C_{OUT}$ signal through the blocks of adders because the $C_{OUT}$ signal from each block cannot be generated until the $C_{OUT}$ signal of all preceding blocks has been generated. That is to say, according to the prior art, the proper $C_{OUT}$ signals from each one of the blocks of adders making up a 32 bit adder cannot be generated simultaneously.

SUMMARY OF THE INVENTION

With this background of the invention in mind it is therefore a primary object of this invention to provide an improved 32-bit digital adder with blocks of adders wherein simultaneous selection of a carry signal may be made in all blocks of such an adder.

The foregoing and other objects of this invention are generally attained by providing a 32-bit digital adder wherein blocks of four bit adders are used, each block containing four full adders, the carry generating portion of each such full adder being arranged always to produce a carry-out signal at a logic one and a logic zero level with a selector circuit responsive to the digital signals to be added and to the carry-in signal to pass a carry-out signal having the proper logic level to the next following full adder.

BRIEF DESCRIPTION OF THE DRAWINGS

For a more complete understanding of this invention reference is now made to the following description of the accompanying drawings, wherein.

DESCRIPTION OF THE PREFERRED EMBODIMENT

Before referring to the Figures in detail it will be observed that, in any adder stage used in a multibit adder, there are three inputs (A, B (the bits to be added) and $C_{IN}$ (the carry-in signal)) and two outputs (S (the sum signal) and $C_{OUT}$ (the carry-out signal)). The possible logic levels of the inputs and outputs are shown in TABLE 1:

TABLE I

| $C_{IN}$ | A | B | S | $C_{OUT}$ |
|---|---|---|---|---|
| 0 | 0 | 0 | 0 | 0 |
| 0 | 1 | 0 | 1 | 0 |
| 0 | 0 | 1 | 1 | 0 |
| 0 | 1 | 1 | 0 | 1 |
| 1 | 0 | 0 | 1 | 0 |
| 1 | 1 | 0 | 0 | 1 |
| 1 | 0 | 1 | 0 | 1 |
| 1 | 1 | 1 | 1 | 1 |

When a number (here 32) of adder stages is combined to form a multibit adder, the carry-out signal of the least significant stage is the carry-in signal to the next least significant stage and so on until the carry-in signal to the most significant stage is obtained. Because the invention here is directed toward circuitry for increasing the speed at which the "carry-out—carry-in" signals are propagated through a multibit adder, only the circuitry for accomplishing the generation and propagation of such signals will be shown in detail. Further, because the circuitry for generating and propagating the "carry-in—carry-out" signals is duplicated in each adder stage, only the contemplated "carry-in—carry-out" circuitry between the least significant and the next least significant stage of a multibit adder will be shown and described in detail.

Figure 1:
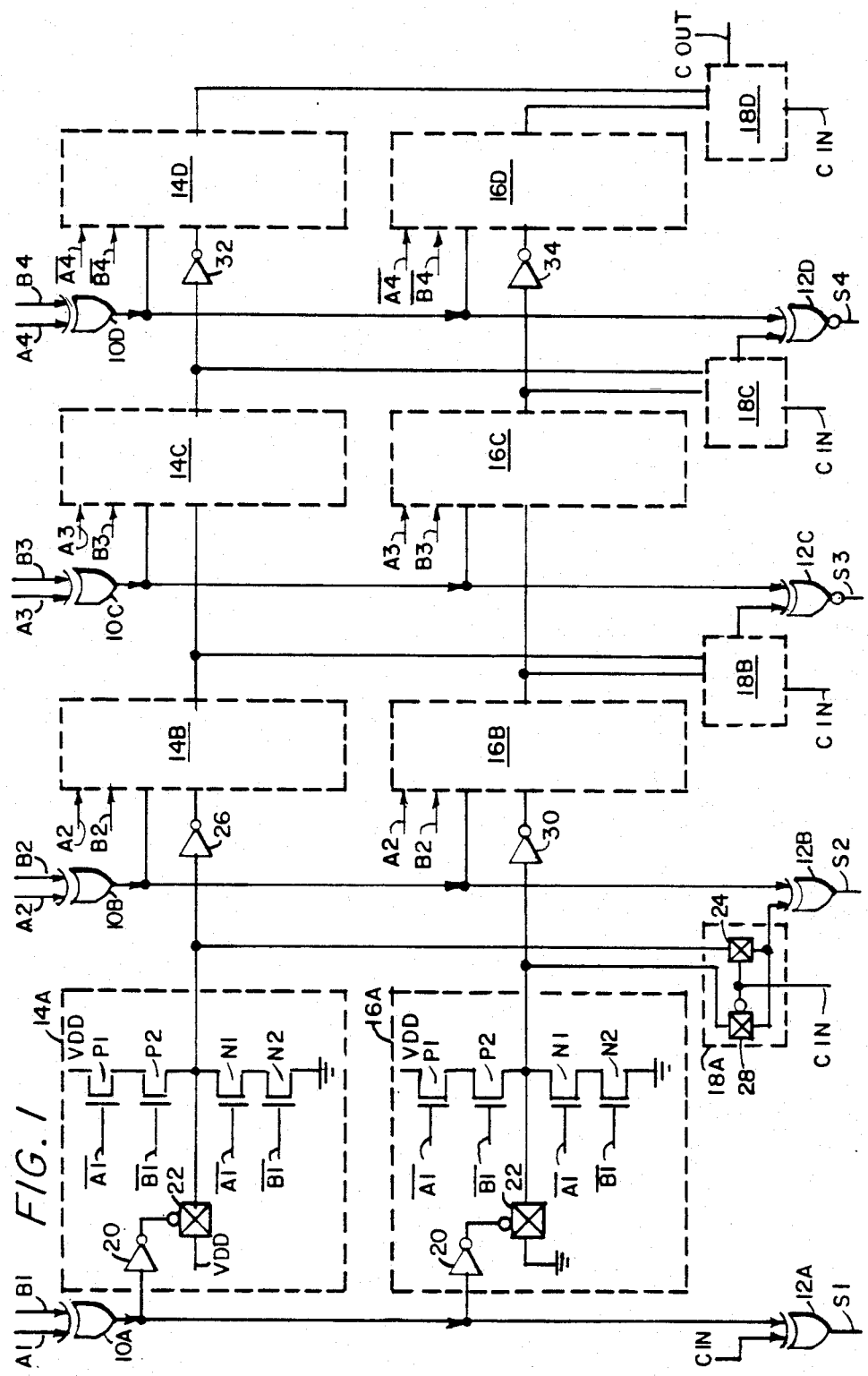
FIG. 1 is a simplified diagram of a four-bit adder making up a block of adders according to this invention.

With the foregoing in mind it may be seen in FIG. 1 that a four bit adder (sometimes referred to as a block of adders) comprises: (a) four EXCLUSIVE OR gates 10A, 10B, 10C, 10D to which bits (A1 . . . A4 and B1 . . . B4) to be added are applied; (b) two EXCLUSIVE OR gates 12A, 12B and two EXCLUSIVE NOR gates 12C, 12D to which the extant signal at the output of a corresponding one of the EXCLUSIVE OR gates 10A, 10B, 10C, 10D and a CARRY signal are applied; (c) carry generated circuitry 14A, 14B, 14C, 14D and 16A, 16B, 16C, 16D disposed between successive adder stages as shown; and (d) selector circuitry 18A, 18B, 18C, 18D to cause the carry signal applied to the EXCLUSIVE OR gate 12B and the EXCLUSIVE NOR gates 12C, 12D and the signals out of the block of adders to have the proper logic level.

The carry generating circuitry 14A comprises an inverter 20 connected between the output of the EXCLUSIVE OR GATE 10A and a gate 22 (here a p-type field effect transistor (FET). The output of the inverter 20 is connected to the gate electrode (not shown) of the FET while a voltage source, $V_{DD}$, representative of a logic one level, is connected to the source electrode (not shown) of the FET. The drain electrode (not shown) of the FET is connected to: (a) the junction (not numbered) of a first pair of p-type FETS (P1, P2) and a second pair of n-type FETS (N1, N2); (b) a gate 24 (here an n-type FET) in the selector circuitry 18A; and (c) to the input of an inverter 26. The first pair of p-type FETS are serially connected as shown to the voltage source $V_{DD}$ and the second pair of n-type FETS are serially connected as shown to ground. The gate electrode (not numbered) of one FET in each pair is connected, via an inverter (not shown) to the A1 and B1 inputs. In this connection it should be noted that if the bits to be added, i.e. the $\overline{A1}$ and $\overline{B1}$ inputs are taken from a register (not shown), the A1 and B1 signals applied to the FETS P1, P2, N1, N2 would be taken off the complementary outputs of the appropriate register stages.

Internally, the elements making up the carry generating circuitry 16A are the same as the elements described above for the carry generating circuitry 14A. However, the source electrode (not shown) of the FET making up the gate 22 in the carry generating circuitry 16A is grounded and the drain electrode (not shown) is, in addition to being connected to the junction of the pairs of FETS in the carry generating circuitry 16A connected to a gate 28 (Here a p-type FET) and to an inverter 30.

The $C_{IN}$ signal is applied to the gate electrodes (not shown) of the FETS (not shown) making up the gates 24, 28 in the selector circuitry 18A. The output of the selector circuitry is applied to the EXCLUSIVE OR gate 12B. It is apparent, therefore, that the logic level of $C_{IN}$ determines which one of the gates 24, 28 allows a signal to be passed to the EXCLUSIVE OR gate 12B. That is to say, if $C_{IN}$ is at a logic one level, gate 24 is enabled to pass the signal out of the carry generating circuitry 14A, but if $C_{IN}$ is at a logic zero level, gate 28 is enabled to pass the signal out of the carry generating circuitry 16A.

It will be observed that the carry generating circuitry 14A constitutes a logic circuit producing either a logic one signal or a logic zero signal in accordance with TABLE II:

TABLE II

| A1 | B1 | OUTPUT, 10A | $C_{IN}(V_{DD})$ | P1, P2 | N1, N2 | G22 | OUTPUT, 14A |
|---|---|---|---|---|---|---|---|
| 0 | 0 | 0 | 1 | OFF | ON | OFF | 0 |
| 1 | 0 | 1 | 1 | OFF | OFF | ON | 1 |
| 0 | 1 | 1 | 1 | OFF | OFF | ON | 1 |
| 1 | 1 | 0 | 1 | ON | OFF | OFF | 1 |

Similarly, carry generating circuitry 16A operates in accordance with TABLE III:

TABLE III

| A1 | B1 | OUTPUT, 10A | $C_{IN}(0)$ | P1, P2 | N1, N2 | G22 | OUTPUT, 16A |
|---|---|---|---|---|---|---|---|
| 0 | 0 | 0 | 0 | OFF | ON | OFF | 0 |
| 1 | 0 | 1 | 0 | OFF | OFF | ON | 0 |
| 0 | 1 | 1 | 0 | OFF | OFF | ON | 0 |
| 1 | 1 | 0 | 0 | ON | OFF | OFF | 1 |

It follows then that the correct carry signal is applied to EXCLUSIVE OR gate 12B if the signal out of the carry generating circuitry 14A is applied to the EXCLUSIVE OR gate 12B when $C_{IN}$ to EXCLUSIVE OR gate 12A is at a logic one level and the signal out of the carry generating circuitry 16A is applied to the EXCLUSIVE OR gate 12B when $C_{IN}$ to the EXCLUSIVE OR gate 12A is at a logic zero level. Therefore, the proper carry signal will be applied to the EXCLUSIVE OR gate 12B, depending on the values of A1 and B1.

Digressing now it will be noted that, if the carry generating circuitry 14B were exactly the same as carry generating circuitry 14A, the operation of the carry generating circuitry 14B would be as shown in TABLE IV:

TABLE IV

| OUTPUT, 14A | A2 | B2 | OUTPUT, 10B | G22 | P1P2 | N1N2 | OUTPUT, 14B |
|---|---|---|---|---|---|---|---|
| 0 | 0 | 0 | 0 | OFF | OFF | ON | 0 |
| 0 | 1 | 0 | 1 | ON | OFF | OFF | 0 |
| 0 | 0 | 1 | 1 | ON | OFF | OFF | 0 |
| 0 | 1 | 1 | 0 | OFF | ON | OFF | 1 |
| 1 | 0 | 0 | 0 | OFF | OFF | ON | 0 |
| 1 | 1 | 0 | 1 | ON | OFF | OFF | 1 |

TABLE IV-continued

| OUTPUT, 14A | A2 | B2 | OUTPUT, 10B | G22 | P1P2 | N1N2 | OUTPUT, 14B |
|---|---|---|---|---|---|---|---|
| 1 | 0 | 1 | 1 | ON | OFF | OFF | 1 |
| 1 | 1 | 1 | 0 | OFF | ON | OFF | 1 |

Similarly, if the carry generating circuitry 16B were exactly the same as the carry generating circuitry 16A, the operation of the carry generating circuitry 16B would be as shown in TABLE V:

TABLE V

| OUTPUT, 16A | A2 | B2 | OUTPUT, 10B | G22 | P1P2 | N1N2 | OUTPUT, 16B |
|---|---|---|---|---|---|---|---|
| 0 | 0 | 0 | 0 | OFF | OFF | ON | 0 |
| 0 | 1 | 0 | 1 | ON | OFF | OFF | 0 |
| 0 | 0 | 1 | 1 | ON | OFF | OFF | 0 |
| 0 | 1 | 1 | 0 | OFF | ON | OFF | 1 |
| 1 | 0 | 0 | 0 | OFF | OFF | ON | 0 |
| 1 | 1 | 0 | 1 | ON | OFF | OFF | 1 |
| 1 | 0 | 1 | 1 | ON | OFF | OFF | 1 |
| 1 | 1 | 1 | 0 | OFF | ON | OFF | 1 |

In order to use the complementary adder stages shown in U.S. patent application Ser. No. 648,930, filed Sept. 10, 1984, it is necessary that the carry-in signal to each one of the carry generating circuitries 14B, 16B be the complement of the carry-out signal of the preceding carry generating circuitry 14A, 16A. Therefore, neither carry generating circuitry 14B nor carry generating circuitry 16B may operate as shown in TABLES IV or V. However, carry generating circuitry 14B, 16B may be caused to produce the requisite complements without changing either of the arrangements making up carry generating circuitry 14A, 16A. Thus, if (a) an inverter (inverter 26, 30) is disposed in circuit with the gate 22 (not shown) within the carry generating circuitry 14B, 16B; and (b) the FETS (not shown) within carry generating circuitry 14B, 16B are controlled by A2, B2 (rather than $\overline{A2}$, $\overline{B2}$) then the carry generating circuitry will operate as shown in TABLE VI.

TABLE VI

| OUTPUT (14A, 16A) | A2 | B2 | OUTPUT (10B) | GATE 22 | P1P2 | N1N2 | OUTPUT (14B, 16B) |
|---|---|---|---|---|---|---|---|
| 0 | 0 | 0 | 0 | OFF | ON | OFF | 1 |
| 0 | 1 | 0 | 1 | ON | OFF | OFF | 1 |
| 0 | 0 | 1 | 1 | ON | OFF | OFF | 1 |
| 0 | 1 | 1 | 0 | OFF | OFF | ON | 0 |
| 1 | 0 | 0 | 0 | OFF | ON | OFF | 1 |
| 1 | 1 | 0 | 1 | ON | OFF | OFF | 0 |
| 1 | 0 | 1 | 1 | ON | OFF | OFF | 0 |
| 1 | 1 | 1 | 0 | OFF | OFF | ON | 0 |

Inspection of TABLE VI shows that the carry generating circuitry 14B, 16B then produces the requisite complements that may be applied directly to carry generating circuitry 14C, 16C. The output of each one of the just-mentioned circuitry must then be inverted in inverters 32, 34 before being applied to carry generating circuitry 14D, 16D.

The outputs of carry generating circuitry 14B, 16B are applied to selector circuitry 18B which is identical to selector circuitry 18A. Thus, either the output of the carry generating circuitry 14B or the output of the carry generating circuitry 16B is passed to the EXCLUSIVE NOR gate 12C. With the output of the EXCLUSIVE OR gate 10C also applied to the EXCLUSIVE NOR gate 12C, S3 is formed on the output of such NOR gate.

The carry generating circuitry 14C, 16C, 14D, 16D is identical to the carry generating circuitry 14A, 16A, with inverters 32, 34 disposed as shown between the "C" and "D" stages and "A" and "B" signals, as indicated. The proper one of the outputs of the carry generating circuitry 14C, 16C is passed by selector circuitry 18C to the EXCLUSIVE NOR gate 12D to be combined with the output of the EXCLUSIVE OR gate 10D to produce S4. It will now be evident that, starting from the least significant bit (S1) in the four-bit sum (S1+S2+S3+S4), the output of proper ones of the carry generating circuitry (14A, 14B and 14C or 16A, 16B and 16C) will have been selected in accordance with the level of $C_{IN}$ and that the proper carry signals will have been generated for each successive adder stage and for $C_{OUT}$.

Figures 2, 3:
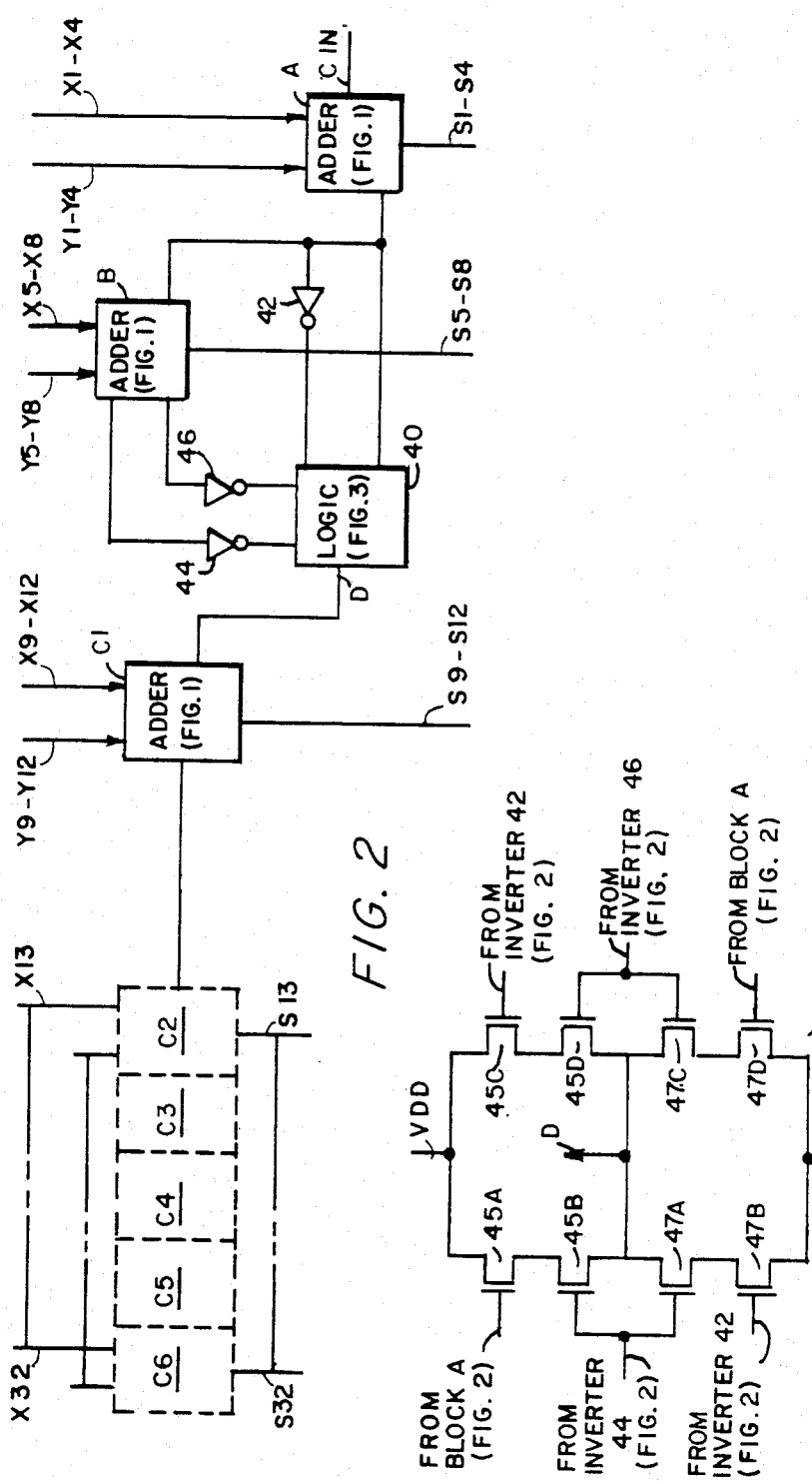
FIG. 2 is a simplified block diagram of a 32-bit adder using the four-bit adders of FIG. 1.
FIG. 3 is a schematic diagram of the logic network shown in FIG. 2.

Referring now to FIG. 2, a 32-bit adder according to this invention is shown to comprise eight blocks of adder stages A, B, C1 . . . C6, each block including a four-bit adder stage as shown in FIG. 1. The $C_{OUT}$ signal from block A is passed to the $C_{IN}$ terminal (not numbered) of block B, a logic network 40 (FIG. 3) and an inverter 42. The output of the inverter 42 is passed to the logic network 40 (FIG. 3) along with the signals out of inverters 44, 46 to which are applied the outputs of the carry generating circuitry 14D and 16D (FIG. 1) in block B. The output signal from the logic network 40 is shown to be provided both as the $C_{IN}$ input signal to the block C1. Each subsequent block (blocks C3 . . . C6) of the 32-bit adder is also identical in construction to block C1 to provide the desired 32-bit adder.

Referring now to FIG. 3, the logic network 40 is shown to comprise four p-channel field effect transistors (FETS) 45A . . . 45D and four n-channel FETS 47A . . . 47D. The logic network 40 then is effective, in response to the applied signals, to produce an output signal, D, having a status dependent solely on the status of the signals from block A (FIG. 2). Otherwise stated, it is the status of the carry-in input (i.e., whether a logic level "0" or "1") to the block A that determines the status of the D output signal from the logic network 40. The D output signal in turn is effective to control selector switches in block C1 (FIG. 2) so that the sum output of the proper one of the four bit adders in block C1 is selected.

Having described a preferred embodiment of this invention, it will now be evident to one of skill in the art that the embodiment may be changed without departing from the inventive concepts. It is felt, therefore, that this invention should not be restricted to the disclosed embodiment, but rather should be limited only by the spirit and scope of the appended claims.

What is claimed is:

1. In a multibit digital computer wherein blocks of adders, each containing at least a pair of single bit adders, are connected in parallel to add two multibit digital numbers and to respond to a $C_{IN}$ signal, the improvement comprising:

(a) a pair of carry generating circuitry having identical elements disposed between successive single bit adders, the first one of such circuitry having a $C_{IN}$ signal at a logic one level applied thereto and the second one of such circuitry having a $C_{IN}$ signal at a logic zero level applied thereto, both such circuitries being responsive to the complement of the bits applied to the preceding single bit adder to produce a carry-in signal for the next following single bit adder; and (b) means, responsive to the $C_{IN}$ signal to the single bit adder operating on the least significant bits of the multibit digital numbers, for selecting the proper one of the carry-in signal out of each pair of first and second carry generating circuitries.

2. The improvement as in claim 1 wherein the pairs of carry generating circuitry between the single bit adder for the least significant bits, A1, B1, in the multibit adder and the second least significant bit operate according to the following truth table where C is the logic level of the signal out of each such circuitry:

| $C_{IN}$ | A1 | B1 | C |
|---|---|---|---|
| 1 | 0 | 0 | 0 |
| 1 | 1 | 0 | 1 |
| 1 | 0 | 1 | 1 |
| 1 | 1 | 1 | 1 |
| 0 | 0 | 0 | 0 |
| 0 | 1 | 0 | 0 |
| 0 | 0 | 1 | 0 |
| 0 | 1 | 1 | 1 |

3. The improvement as in claim 2 having, additionally, at least a second pair of single bit adders wherein each one of the pairs of carry generating circuitry between the adders for the second least significant bit and the third least significant bit operates in accordance with the following truth table:

| $C_{IN}$ | A2 | B2 | C |
|---|---|---|---|
| 0 | 0 | 0 | 1 |
| 1 | 1 | 0 | 1 |
| 1 | 0 | 1 | 1 |
| 1 | 1 | 1 | 0 |
| 0 | 0 | 0 | 1 |
| 0 | 1 | 0 | 0 |
| 0 | 0 | 1 | 0 |
| 1 | 1 | 1 | 0 |

4. The improvement as in claim 3 wherein each one of the carry generating circuitry between the adders for the third and fourth least significant bit operate in accordance with the truth table in claim 2.

5. The improvement as in claim 4 having, additionally, a third pair of single bit adders, wherein each one of the pairs of carry generating circuitry between the adders for the fourth and fifth least significant bits operate in accordance with the truth table in claim 3.

* * * * *

UNITED STATES PATENT AND TRADEMARK OFFICE
CERTIFICATE OF CORRECTION

PATENT NO. : 4,675,838

DATED : June 23, 1987

INVENTOR(S) : Moshe Mazin and Edward T. Lewis

It is certified that error appears in the above-identified patent and that said Letters Patent is hereby corrected as shown below:

On the Title Page:
As printed: [73] Assignee: Delaware, Lexington, Mass.

Please correct as follows:

[73] Assignee: Raytheon Company, Lexington, Mass.

Signed and Sealed this

Seventeenth Day of May, 1988

Attest:

DONALD J. QUIGG

*Attesting Officer*  *Commissioner of Patents and Trademarks*